(12) United States Patent
Russell et al.

(10) Patent No.: US 11,770,308 B2
(45) Date of Patent: Sep. 26, 2023

(54) SYSTEM AND METHOD FOR CLOUD-BASED USER INTERFACE APPLICATION DEPLOYMENT

(71) Applicant: WARNERMEDIA DIRECT, LLC, New York, NY (US)

(72) Inventors: Stuart Russell, Ottawa (CA); Mathieu-André Chiasson, Woodlawn (CA)

(73) Assignee: WARNERMEDIA DIRECT, LLC, New York, NY (US)

( * ) Notice: Subject to any disclaimer, the term of this patent is extended or adjusted under 35 U.S.C. 154(b) by 0 days.

(21) Appl. No.: 17/983,456

(22) Filed: Nov. 9, 2022

(65) Prior Publication Data
US 2023/0070174 A1  Mar. 9, 2023

Related U.S. Application Data

(63) Continuation of application No. 17/092,921, filed on Nov. 9, 2020, now abandoned, which is a
(Continued)

(51) Int. Cl.
*H04L 41/22* (2022.01)
*G06T 11/60* (2006.01)
(Continued)

(52) U.S. Cl.
CPC .............. *H04L 41/22* (2013.01); *G06F 9/451* (2018.02); *G06T 11/60* (2013.01); *H04L 43/045* (2013.01);
(Continued)

(58) Field of Classification Search
None
See application file for complete search history.

(56) References Cited

U.S. PATENT DOCUMENTS

2012/0174000 A1\* 7/2012 Zavatone .................. G06F 8/38
715/763
2014/0075477 A1   3/2014 De Paz et al.
(Continued)

FOREIGN PATENT DOCUMENTS

EP         2584464 A2     4/2013

OTHER PUBLICATIONS

European Patent Application No. 17883158.2 , Communication pursuant to Article 94(3), dated Sep. 21, 2021, 5 pages.
(Continued)

*Primary Examiner* — Cai Y Chen
(74) *Attorney, Agent, or Firm* — Leber IP Law; David C. Robertson

(57) ABSTRACT

Systems and methods are provided for user interface deployment that include a server with a cloud application and a client device with a client application. The cloud application is a fully functional application, such as a headless application, and transmits scene graph data including presentation data and behavior data for a first set of user interface elements viewable at the client device in a first operational
(Continued)

state. The client application locally renders the first set of user interface elements on a client device display to locally render the portion of the scene graph related to the first operational state. In response to a user input, the client application transmits event or state data to the cloud application and may perform an action associated with the user input while awaiting receipt of updated scene graph data, possibly related to a subsequent operational state, reducing or eliminating the perception of latency.

18 Claims, 7 Drawing Sheets

Related U.S. Application Data continuation of application No. 15/851,481, filed on Dec. 21, 2017, now Pat. No. 10,833,956.

(60) Provisional application No. 62/437,237, filed on Dec. 21, 2016.

(51) Int. Cl.
*G06F 9/451* (2018.01)
*H04L 43/045* (2022.01)
*H04L 43/0817* (2022.01)
*H04L 67/01* (2022.01)
*H04L 67/568* (2022.01)

(52) U.S. Cl.
CPC .......... *H04L 43/0817* (2013.01); *H04L 67/01* (2022.05); *H04L 67/568* (2022.05)

(56) References Cited

U.S. PATENT DOCUMENTS

2014/0125672 A1 5/2014 Winternitz et al.
2015/0012905 A1 1/2015 Emmons

OTHER PUBLICATIONS

European Patent Application No. 17883158.2, Extended European Search Report dated Jun. 29, 2020, 10 pages.
European Patent Application No. 17883158.2, European Office Action dated Feb. 2, 2023, 6 pages.
International Patent Application No. PCT/CA2017/051582, International Preliminary Report on Patentability dated Jun. 25, 2019, 5 pages.
International Patent Application No. PCT/CA2017/051582, International Search Report and Written Opinion dated Feb. 13, 2018, 8 pages.
Lakshman et al., "Enhancing Enterprise Field Productivity via Cross Platform Mobile Cloud Apps," Proceedings of the Second International Workshop on Mobile Cloud Computing and Services, Jun. 2011, pp. 27-32. XP058004406.
U.S. Appl. No. 15/851,481, Non-Final Office Action dated Jun. 23, 2020, 19 pages.
U.S. Appl. No. 15/851,481, Notice of Allowance dated Aug. 24, 2020, 7 pages.
U.S. Appl. No. 15/851,481, Corrected Notice of Allowability dated Oct. 5, 2020, 4 pages.
U.S. Appl. No. 17/092,921, Final Rejection dated May 4, 2022, 11 pages.
U.S. Appl. No. 17/092,921, Non-Final Office Action dated Dec. 21, 2021, 18 pages.
U.S. Appl. No. 17/092,921, Notice of Allowance dated Jul. 27, 2022, 9 pages.

* cited by examiner

SYSTEM AND METHOD FOR CLOUD-BASED USER INTERFACE APPLICATION DEPLOYMENT

CROSS-REFERENCE TO RELATED APPLICATIONS

This application is a continuation of U.S. patent application Ser. No. 17/092,921 filed on Nov. 9, 2020, which is a continuation of U.S. patent application Ser. No. 15/851,481 filed on Dec. 21, 2017, now U.S. Pat. No. 10,833,956 which issued on Nov. 10, 2020, and claims priority to U.S. Provisional Application Ser. No. 62/437,237 filed Dec. 21, 2016, the entire contents of which are hereby incorporated.

FIELD

Embodiments described herein relate to application deployment, including but not limited to user interface application deployment.

BACKGROUND

Stand-alone native applications can include or house all business logic, user interface elements, and API interactions with third-party services and content and may be successfully deployed on various platforms. However, some platforms may not easily support certain native applications. Additionally, it can be difficult and costly to develop separate applications for each of a plurality of platforms.

A device running a stand-alone native application can become constrained or operate more slowly based on the complexity of the application, or limitations of the device, or both. This can manifest itself in the appearance of latency when the application is presented to a user. This can be particularly true with respect to applications having high graphical content, for example user interfaces.

Improvements in systems and methods for application deployment are desirable.

SUMMARY

In an embodiment, the present disclosure provides a system for user interface deployment comprising: a server running a cloud application; and a client device running a client application, the client device comprising a display screen. The cloud application is configured to: obtain a scene graph for a plurality of user interface elements; convert a portion of the scene graph into first state scene graph data, the first state scene graph data comprising presentation data and behavior data for a first set of user interface elements viewable at the client device in a first operational state, the first set of user interface elements being among the plurality of user interface elements, the first state scene graph data being provided in a format compatible with the client platform, and transmit the first state scene graph data to the client device. The client application is configured to: render the first set of user interface elements at the client device using the received first state scene graph data to display a user interface including the first set of user interface elements on the display screen of the client device so as to locally render the portion of the scene graph related to the first operational state.

In an example embodiment, the cloud application and the client application are configured to exchange event data representing client application state information or cloud application state information. In an example embodiment, the event data comprises data relating to operations, triggers, data sets, or activations. In an example embodiment, the event data comprises user triggered event data, time triggered event data, event triggered event data, or previous screen triggered event data. In an example embodiment, the event data comprises data relating to user navigation on the user interface. In an example embodiment, the event data comprises selection event data relating to selection and activation of a displayed user interface element.

In an example embodiment, the client application is configured to inform the cloud application of a locally handled event in order for the cloud application to keep track of a current state of the client application. In an example embodiment, the client application and the cloud application cooperate to provide distributed handling of events by delegating processing of some events to the cloud application.

In an example embodiment, the first set of user interface elements comprises an empty scene graph element, and wherein the first state scene graph data comprises instructions for the client application to communicate directly with a content management system to populate the empty scene graph element.

In an example embodiment, in response to receipt of event data at the client application from the cloud application, the client application is configured to communicate directly with a content management system to acquire content independent of the cloud application.

In an example embodiment, the cloud application sends all of the first state scene graph data at the same time or in a single transmission. In an example embodiment, the cloud application sends a first portion of the first state scene graph data at a first time, and sends a second portion of the first state scene graph data at a second time.

In an example embodiment, the cloud application is further configured to differentiate between cloud application scene graph data and client application scene graph data, and to convert the portion of the scene graph into the first scene graph data based on the determined client application scene graph data.

In an example embodiment, the cloud application comprises: a business logic unit storing a state of the application; a server event communication unit configured to receive events from the client application; and an internal renderer configured to create the scene graph and to convert the scene graph into the first state scene graph data to facilitate display at the client device.

In an example embodiment, the client application comprises: a client event communication unit configured to detect and capture event or status data and transmit the event or status data to the cloud application; and a local renderer to receive the first state scene graph data and to locally render the first set of user interface elements.

In an example embodiment, the first state scene graph data encodes one or more graphic frames and one or more relationships between the one or more graphic frames to render and display the user interface in the first operational state.

In an example embodiment, the cloud application is configured to generate the scene graph.

In an example embodiment, the server runs the cloud application on a server platform, and the client device runs the client application on a client platform, the client platform being different from the server platform.

In an example embodiment, the server comprises a processor and a memory storing cross-platform application code for execution to provide the cloud application on the server or on a plurality of platforms.

In an example embodiment, the server further comprises a centralized caching mechanism to pre-emptively push content to a cache for elements of the client application that are common to a plurality of users engaged with one or more client applications.

In an example embodiment, the client device further comprises a local caching mechanism employing either pre-caching or post-caching based on user views within the user interface.

In an embodiment, the present disclosure provides a non-transitory machine-readable memory storing statements and instructions for execution by a processor at a server to provide a cloud application for user interface deployment to: obtain a scene graph for a plurality of user interface elements; convert a portion of the scene graph into first state scene graph data, the first state scene graph data comprising presentation data and behavior data for a first set of user interface elements viewable at a client device in a first operational state, the first set of user interface elements being among the plurality of user interface elements, the first state scene graph data being provided in a format compatible with a client platform, and transmit the first state scene graph data to the client device for local rendering of the portion of the scene graph related to the first operational state at the client device including the first set of user interface elements.

In another embodiment, the present disclosure provides a system for user interface deployment comprising: a server running a headless cloud application, the cloud application configured to generate and transmit scene graph data including presentation data and behavior data for a first set of user interface elements; a client device running a client application, the client device comprising a display screen, the client application configured to receive the scene graph data relating to the first set of user interface elements which are viewable at the client device in a first operational state, and to locally render the first set of user interface elements on the display screen to locally render the portion of a scene graph related to the first operational state.

In an example embodiment, in response to a user input, the client application: transmits event or state data to the cloud application; and performs an action associated with the user input while awaiting receipt of updated scene graph data so as to reduce perception of latency.

In an example embodiment, the client application is configured to, in response to receipt of updated scene graph data, delete previously received scene graph data.

In an example embodiment, the system further comprises an associated client device, and the client device is configured to facilitate display of one or more of the user interface elements on the associated client device.

In an example embodiment, the cloud application comprises a cross-platform client application running in a headless form on one or more remote servers.

In an example embodiment, a single instance of the cloud application runs on a server and connects to a plurality of client applications installed on client devices.

In an example embodiment, the user interface elements comprise graphical elements, and wherein the scene graph data defines a spatial representation of a graphical scene for the graphical elements.

In an example embodiment, the client application is configured to render the user interface elements locally using the scene graph data by parsing the scene graph data and drawing the associated objects on the display screen as dictated by the scene graph data.

In an example embodiment, the client application comprises a rendering engine configured to calculate and update animations locally.

In an example embodiment, the cloud application, in response to receipt of client device type information, obtains a scene graph with a design implementation and layout selected based on the received client device type information.

In an example embodiment, the cloud application is configured to provide first scene graph data representing a first user interface design to a first client device with advanced features, and to provide second scene graph data representing a second user interface design with fewer features to a second client device with limited hardware capabilities.

In an example embodiment, in response to a navigational selection made by a user at the client device that requires a change in the scene graph from the server, a connection between client and the server is updated and a new screen is displayed.

In an example embodiment, the client application: receives an input control from a user, the input control being associated with an event, determines whether the input control corresponds to a locally processed event or a server processed event, and processes the event at the client device in response to a determination that the input control corresponds to a locally processed event.

In an example embodiment, the server informs the client application of actions to be performed by the client application at the client device.

In an example embodiment, the client application informs the server of a locally executed action to determine a next possible action.

In an example embodiment, the system comprises a plurality of cloud application instances and a plurality of client applications, each of the plurality of cloud application instances being uniquely associated with one of the plurality of client applications.

In an example embodiment, the client application comprises statements and instructions for execution by a plurality of different client devices running on different platforms.

In an example embodiment, the cloud application serves a plurality of client applications.

In an example embodiment, the cloud application transmits additional scene graph data for rendering graphics that are adjacent to graphics that are in view in the first operational state.

In an example embodiment, wherein the cloud application is associated with one or more servers managed by different entities.

In an example embodiment, wherein a first client application compatible with a first platform running on one or more client devices is implemented with code identical to code implementing a second client application compatible with a second platform.

In an example embodiment, wherein the system comprises a unit for associating a container only when the client application has an active session with the cloud application.

In an example embodiment, wherein the system is configured to automatically free up a container after expiry of an active session timer initiated when the client application requested graphics from with the cloud application and in the absence of any further graphics request.

In an example embodiment, wherein the client device comprises a native application for rendering graphics.

In an example embodiment, wherein the server comprises a single remote server associated with a plurality of running instances of the cloud application. In an example embodiment, the server comprises a virtual server. In an example embodiment, the client device comprises a media device, media player, smart television or a set-top-box.

BRIEF DESCRIPTION OF THE DRAWINGS

Embodiments will now be described, by way of example only, with reference to the attached figures, wherein in the figures.

DETAILED DESCRIPTION

Figure 1:
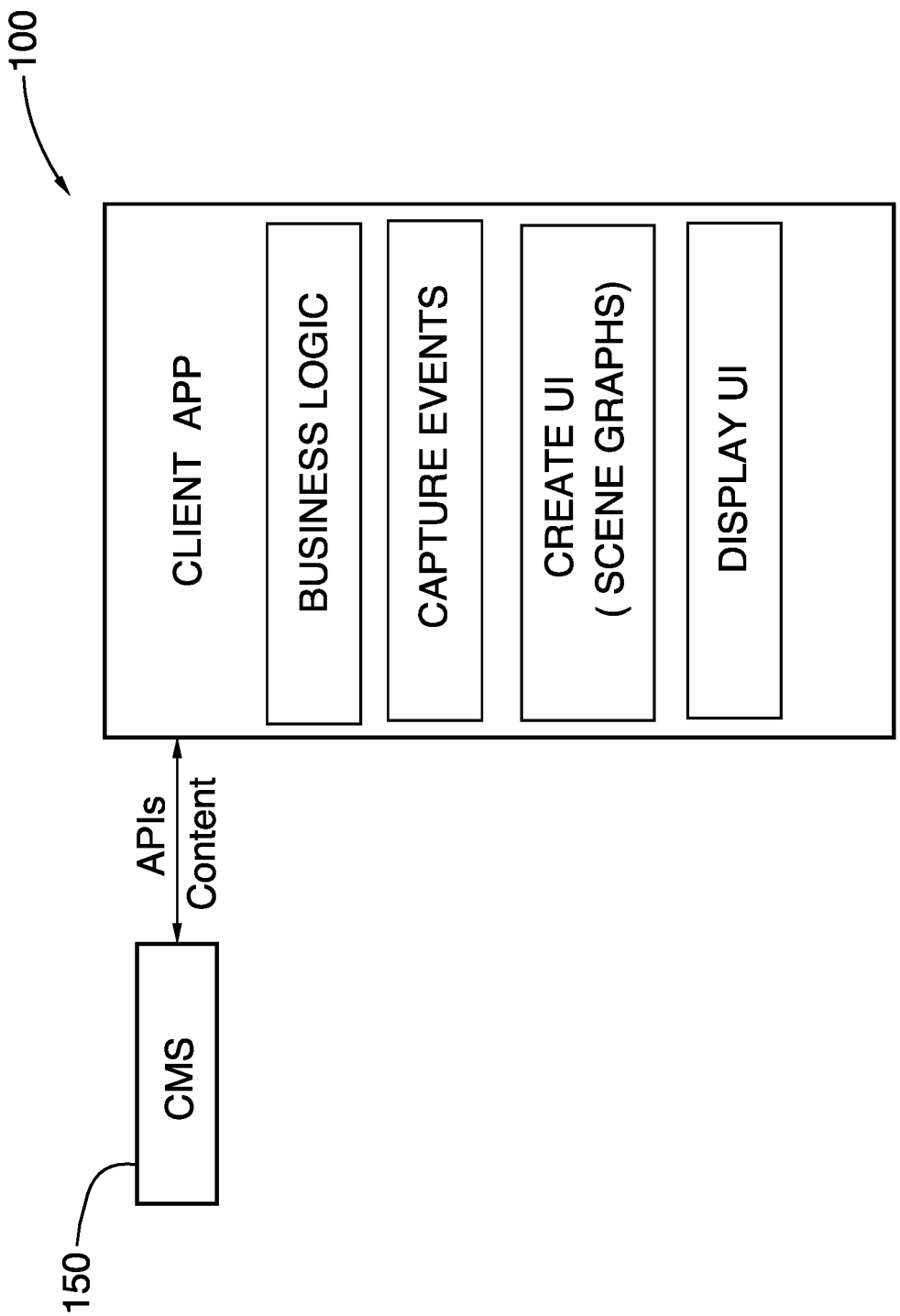
FIG. 1 illustrates a prior art user interface or graphics deployment system.

Systems and methods are provided for user interface deployment that include a server with a cloud application and a client device with a client application. The cloud application is a fully functional application, such as a headless application, and transmits scene graph data including presentation data and behavior data for a first set of user interface elements viewable at the client device in a first operational state. The client application locally renders the first set of user interface elements on a client device display to locally render the portion of the scene graph related to the first operational state. In response to a user input, the client application transmits event or state data to the cloud application and may perform an action associated with the user input while awaiting receipt of updated scene graph data, possibly related to a subsequent operational state, which can reduce or eliminate the perception of latency.

Embodiments described herein relate to cloud based user interface application deployment platforms that use theme or scene graphs for user interface application configuration. For example a cloud application generates a scene graph for user interface elements and a client application renders the user interface elements using data generated from the scene graph to display the user interface. Embodiments described herein relate to cloud based user interface deployment platforms that dynamically update user interface components on a remote client. Embodiments described herein further relate to other features of cloud based user interface deployment platforms. Embodiments of methods, systems, and apparatus are described through reference to the drawings.

Embodiments described herein relate to cloud based applications for visual graphics. Graphics may refer to user interfaces, components of a user interface, user interface elements, scene graphs, graphic frames (e.g. frames that may be used to render or display a scene), videos, graphical environments, graphic elements such as 3D characters, graphics information, and the like. Graphics may refer to content represented by or similar to that represented by graphics files such as PNG or JPEG. Graphics may refer to scene trees such as those generated by platforms such as AFTER EFFECTS™ (AE) of Adobe, or to animation files. Graphics may refer to time-based animation files, frame-based animation files, and 3D content, for example, created with Maya™, 3D Studio™, Blender™, and the like. Graphics may include data facilitating, enabling, or associated with display, rendering, and/or presentation of graphics and may include data encoding graphics. A cloud application according to an embodiment of the present disclosure is configured to render user interface elements including graphics elements, and non-graphics elements such as text.

In an example embodiment, a cloud application running on a server is a fully functional cloud application capable of providing visual graphics. The cloud application is similar to a stand-alone application that would run directly on a client device having a display, and is capable of performing all functionality of the application. In an example embodiment, instead of rendering visual graphics at a display at the server, the cloud application converts a scene graph to scene graph data that is compatible with a client device platform and gives the client device all of the information needed to display elements of the scene graph along with associated behaviors and/or transitions. The client device receives the scene graph data and renders user interface elements from the scene graph data, without knowledge of the rest of the scene graph or any of the underlying business logic or functionality. In an embodiment, the client application on the client device is a thin client that simply displays visual graphics, or user interface elements, and provides limited behavior functionality based on the received scene graph data. In an example implementation, the client application has no persistently stored business logic and no information about the scene graph other than what is provided in the received scene graph data.

In an example embodiment, the same client application, or thin client, is provided on a plurality of different client devices running on different platforms without any modification of the underlying application code. The cloud application is a fully functional application that is capable of performing all functions and does everything except the actual displaying, and instead determines everything about how to display user interface elements remotely at the client device. The complexity is all performed by the cloud application at the server.

In an embodiment, the scene graph data sent by the cloud application relates to a subset of the user interface described by the scene graph that is viewable at the client device in a first operational state. The scene graph data defines display characteristics of the client application in the first operational state including presentation and behavior, including response to local controls, within a controllable aspect window. In such an arrangement, the cloud application delegates to the client application limited functionality relating to the user interface and its presentation and behavior, for example including animations and transitions, such that the client application provides a functional user interface in that first operational state independent of knowledge of the entire scene graph. The client application is configured to do so with limited processing power, but in a way that reduces the perception of latency by locally performing functions associated with the first operational state, and only accessing the cloud application at the server in response to an event that triggers exiting the first operational state.

The cloud application and the client application are not necessarily in a 1:1 relationship, as the cloud application can handle multiple concurrent client application requests. Embodiments of the present disclosure reduce or eliminate the perception of latency by sending, for a first operational state, all scene graph data with behaviors and associated animations and events relevant to the first operational state so that the client application knows that it has a screen with a small number of available actions associated with the first operational state. The client application can perform one of the actions associated with the first operational state then notify the server when the action has been performed while waiting to receive additional scene graph data associated with a second operational state triggered by the performed action.

In an implementation, first state scene graph data defines display characteristics including presentation and behavior, for example animations and transitions, at a client application in a first operational state. A user action, or user input, may cause the client application to transition from a first operational state to a second operational state, such as from a current operational state to a subsequent operational state. In response to the user input, the client application advantageously sends event or status information to the cloud application while updating the user interface based on the first state scene graph data. In so doing, the client application reduces the perception of latency by locally performing an action while waiting for information from the cloud application. The information from the cloud application can comprise an update to the first state scene graph data, or can comprise second state scene graph data associated with a second operational state to which the client application is transitioning in response to the user input.

In the first operational state, the cloud application enables the client application to communicate directly with a content management system (CMS) or other data source independent of the cloud application and independent of any knowledge or awareness of user interface information or scene graph details outside of the received scene graph data. A system according to an embodiment of the present disclosure is not a total master/slave, and is not a thick client. In an example embodiment, the cloud application provides scene graph data to the client application for specific visual graphics and associated animations and behaviors associated with the first operational state. Within the first operational state, the client application is provided with sufficient data to display user interface elements, play associated animations, and perform local operations while waiting for a response from the server. For example, the client application can generate a video player screen while waiting for additional data from the cloud application relating to a second operational state. In an example embodiment, the scene graph data comprises an empty scene graph element, and the client is instructed to communicate directly with the CMS to populate the empty scene graph element.

FIG. 1 is a diagram of an example prior art system 100 for user interface deployment. The system 100 uses a Native Development Kit (NDK) approach to user interface deployment that enables display of graphics on a device, such as by running an application 110, or "app", on a mobile device. Since the application 110 is running on the device, the application communicates directly with a content management system (CMS) 150. The NDK approach may no longer be compatible with proprietary platforms such as Roku, which have limited processing power at the device, or with web platforms. A system 100 in which an application runs locally on a device may require the application and/or the device to support transmission, storage, retrieval, and/or processing of large amounts of data, for example, relating to graphics that may not be immediately required for display.

Figure 2:
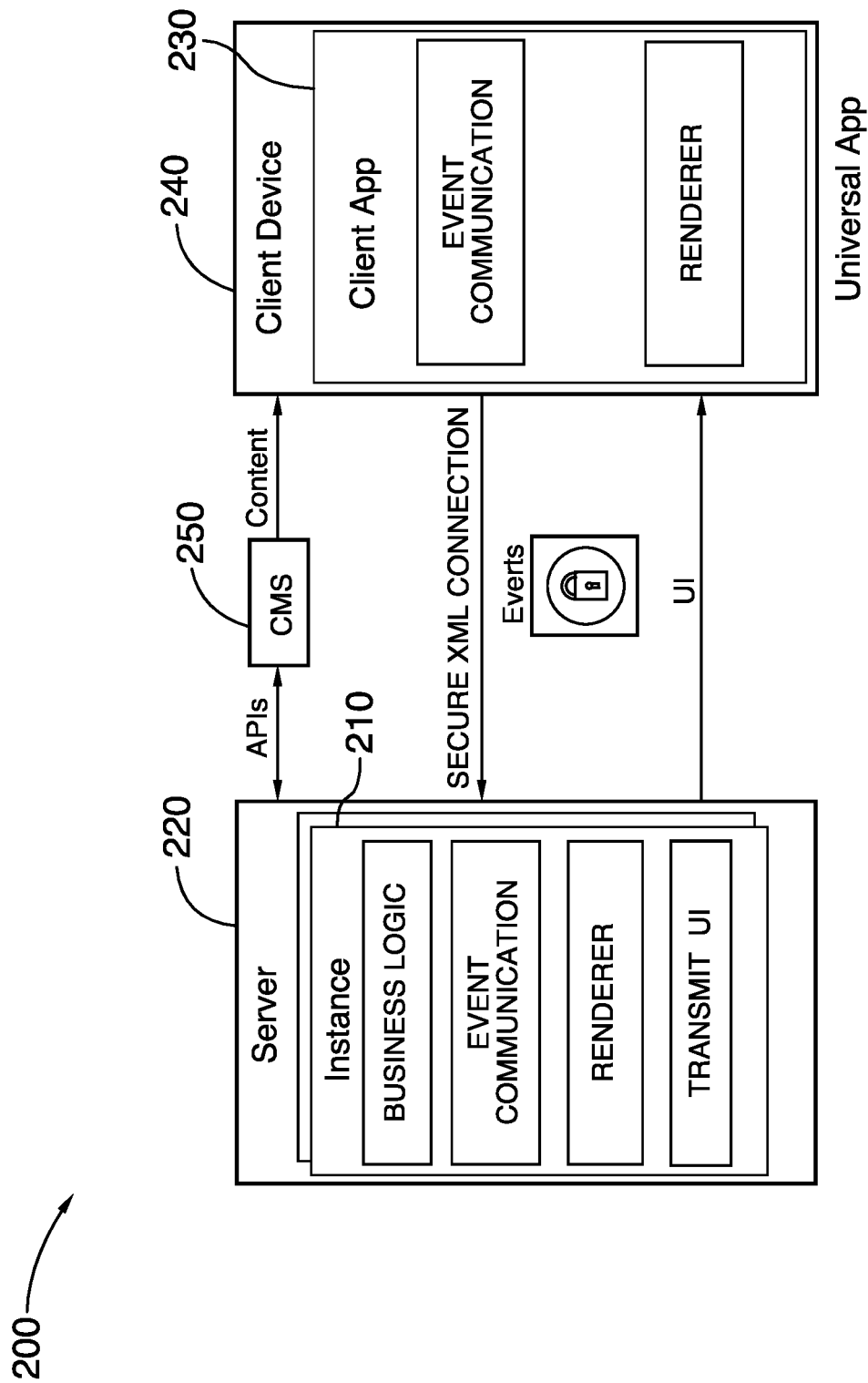
FIG. 2 illustrates a block diagram of a system for a user interface or graphics deployment according to embodiments described herein.

FIG. 2 is a block diagram of an example user interface or graphics deployment system 200 according to some embodiments. A cloud application 210 runs on a server 220, which runs on a server platform. A client application 230 runs on a client device 240, which runs on a client platform. In an example embodiment, the client platform is different from the server platform, but need not be. The client device 240 comprises a display, such as a display screen, while the server 220 either does not have a display screen or does not use a display screen if it is present. In an embodiment, the server 220 comprises a processor and a memory storing statements and instructions for execution to run the cloud application on the server 220. In an embodiment, the client device 240 comprises a processor and a memory storing statements and instructions for execution to run the client application on the client device 240.

In an embodiment, the cloud application 210 is a stand-alone fully functional application which, instead of running on a client device, runs on a remote server, and performs a majority of the functionality associated with the cloud application. In an embodiment, the cloud application is configured to generate a scene graph for a plurality of user interface elements. A scene graph is a data structure that arranges the logical and spatial representation of a graphical scene. In some embodiments, the scene graph contains both the relative spatial information of the objects within the scene as well as the animation information that can affect those objects. Scene graphs may encode one or more graphic frames and one or more relationships between one or more graphic frames and that may be used to render or display one or more user interfaces; components of a user interface, or user interface elements; scenes; text; videos; graphical environments; and/or graphics, such as a 3D character.

In an embodiment, the cloud application 210 is configured to convert a portion of the scene graph into first state scene graph data. The first state scene graph data comprises presentation data and behavior data for a first set of user interface elements viewable at the client device in a first operational state. The first set of user interface elements is among the plurality of user interface elements associated with the scene graph. The first state scene graph data is provided in a format compatible with the client platform. The cloud application 210 is also configured to transmit the first state scene graph data to the client device.

The first operational state refers to a state in which a portion of the scene graph is viewable on the client device 240 and is operational in the client application to receive inputs such as navigation or manipulation of one or more user interface elements. In an embodiment, in the first operational state, the first set of user interface elements is provided with the presentation and behavior characteristics as defined in the scene graph. In an example embodiment, in response to detection of a client device having low performance characteristics, the first set of user interface elements is provided with a subset of the presentation and behavior characteristics defined in the scene graph which are compatible with the low performance characteristics of the client device.

In an embodiment, the client application 230 is a thin client that does not perform any of the complex tasks performed by the cloud application 210, and does not perform a majority of the tasks associated with a stand-alone native application. In an example embodiment, the client application 230 is a limited functionality application that renders a display based on received data and enables behaviors associated with the rendered display, but relies on the server application 210 to perform a majority of other functionality. The thin client is identical across different clients, regardless of the client application. The thin client is compatible with any cloud application configured to communicate with the client application.

In an embodiment, the client application 230 renders the first set of user interface elements at the client device 240 using the received first state scene graph data. The client application displays a user interface including the first set of user interface elements on the display screen of the client device 240 so as to locally render the portion of the scene graph related to the first operational state.

The system 200 exchanges user interface data between the server 200, such as a cloud server, and the client device 240. The user interface data may include one or more user interface assets. The system 200 enables a single client application 230 to be developed for client devices 240 and deployed across multiple platforms. This is referred to as "single code base". When developing for some platforms, such as over-the-top services, developers generally have no choice but to create applications in a custom language specific to a particular over-the-top service. For example, an over-the-top service on the Roku platform has a specific language called "Brightscript". Since this language is custom to a particular over-the-top service, developers currently have to completely rewrite their applications to support the platform for the particular over-the-top service. The system 200 provides the ability for the single code base application code to be run in the cloud server 220, requiring the over-the-top service application to simply be a common client application 230. This common client application 230 is written once and used for multiple customer applications on the over-the-top service with cloud server 220 since it contains no customer application code or logic in the single code base. The client application 230 receives scene graph data relating to a portion of a scene graph of user interface elements. The scene graph data is generated by server 220 and transmitted to client device 240. The client application 230 renders the user interface elements locally on the client device 240 using the scene graph data.

The system 200 includes cloud application 210 that may be housed, run on, and/or associated with one or more remote or cloud servers 220, for example. Servers 220 may include virtual servers, for example. In some embodiments, a single remote or cloud server 220 may install, run, and/or be associated with a plurality of cloud application instances 210. The cloud application 210 may be interoperable with, associated with, and/or paired with one or more client applications 230. A client application 230 is installed, run on, and/or associated with one or more client devices 240. A client device 240 may represent, run on, implement, house, support, and/or be associated with a media device or player, such as for example, an over-the-top service. The media device may be a web or connected device (for example, accessible via desktop or mobile), set-top boxes, over-the-top service, smart television or television supporting internet connectivity and/or connectivity to a remote computing device, browsers, platforms that may engage with web-based technology, and/or other platforms. System 200 may be interoperable with diverse platforms, and this may provide seamless, efficient, convenient, and faster deployment to partners or customers associated with more than one type of platform.

The cloud application 210 may include a business logic unit, cloud event communication unit, and a user interface transmission unit. The cloud application 210 may connect to a content management system 250 using an application programming interface (API). The cloud application 210 is configured to receive event data from the client application 230 for provision to the event communication unit by way of a secure connection. In an embodiment, the cloud application 210 is configured to transmit user interface data to client application 230 for display by way of a secure connection.

As shown in FIG. 2, the content management system 250 is in communication with the cloud application 210 and the client application 230. The server 220, or the cloud application 210, can communicate with the CMS 250 to obtain high level information including data associated with building a scene graph. For a media player application, the data associated with building the scene graph can include: a number of categories; a number of genres; quantities of items (e.g. how many list items); whether a trailer exists for a movie; whether a feature film exists for a movie; whether a review exists for the movie. The cloud application 210 generally does not ask the CMS for detailed content.

The client application 230 can communicate with the CMS to obtain detailed metadata, such as images, descriptions, titles, rankings (such as movie popularity), which are not part of the scene graph data. The client application 230 does not figure out how to communicate with the CMS 250. In an embodiment, in response to receipt of event data at the client application 230 from the cloud application 210, the client application 230 is configured to communicate directly with the CMS 250 to acquire content independent of the cloud application. In an example embodiment, the client application receives a uniform resource locator (URL) from the cloud application 210, for example as part of the scene graph data or as part of event data, and communicates with the CMS 250 as per the content of the URL. In such a scenario, the client application 230 is generally unaware of what content is being requested, or why the content is being requested, and simply carries out instructions as received from the cloud application 210.

The client application 230 may include a client event communication unit and a local renderer, or user interface display unit. The client application 230 detects and captures events data and transmits the events data to the cloud application 210, for example by way of a secure connection. The client application 230 receives user interface data from the cloud application 210 for display. The client application 230 may receive user interface data or information relating to, encoding, or enabling presentation of graphics, for example. The client application 230 may receive scene graph data related to scene graphs as user interface data. The cloud application 210 generates the scene graphs, generates scene graph data and transmits the scene graph data to the client application 230. The client application 230 renders the user interface using the scene graph data, which in an embodiment relates to presentation and behavior of a first set of user interface elements associated with a first operational state. The client application 230 may use the data or information to render graphics, for example, complex 3D scenes that a client device 240 may display dynamically based on user input, actions, and/or interactions with the client device 240 and/or a client application 230 associated with and/or providing input to the client device 240.

Further, a client application 230 may cause and/or facilitate display of graphics on one or more associated client devices 240; capture, translate, and/or store user input, actions, and/or interactions with the client application 230 and/or the one or more client devices 240. The client application 230 may transmit, relay, and/or cause same to one or more remote servers 220, for example, to an instance of the engine 210. A client application 230 may provide access to this display of the device 240 (or display of television connected to device 240) via a graphical processing unit (GPU), for example, included in an associated client device 240; capture user interactions; and may facilitate relay back to a cloud application 210 hosted on one or more servers.

The cloud application 210 may be associated with one or more APIs enabling receipt and transmission of the data, files, and/or content and enabling creation, storage, and/or transmission of data, files, and/or content relating to or enabling presentation or rendering of one or more user interface assets. Example user interface assets include components of a user interface, scene graphs, graphic frames that may, for example, be used to render or display one or more user interfaces; components of a user interface, scenes, videos, graphical environments, and/or graphics, such as a 3D character; and/or graphics information. In an example implementation, the cloud application 210 is generated using a workflow, or a system providing a development platform for streamlining the creation of graphical user interface, in accordance with the teachings of U.S. Pat. No. 9,858,050 issued on Jan. 2, 2018, which is incorporated herein by reference in its entirety.

In some embodiments, client application 230 may receive data, files, and/or content relating to or enabling presentation or rendering of one or more user interfaces; components of a user interface; scene graphs; graphic frames that may, for example, be used to render or display a scene; videos; graphical environments; graphics, such as 3D characters; and/or graphics information. The client application 230 may detect and capture user input, actions, and/or interactions with the client application 230 and/or one or more associated client devices; store and/or transmit data relating to same; and/or cause the detection, capture, storage, and/or transmission. In some embodiments, client application 230 may transmit the data over a secure (e.g. XML) connection to a cloud application instance 210, which may use the data to create one or more user interfaces; components of a user interface; scene graphs; graphic frames that may, for example, be used to render or display scenes, videos, graphical environments, graphics, such as 3D characters; and/or graphics information.

In some embodiments, a cloud application 210 is a cross platform application running in a headless form on a cloud server 220 (or a cluster or distributed group of servers). Headless software is capable of running on computer hardware (e.g. cloud server 220) without a graphical user interface (UI). The headless software application can receive input data and provide output data through other interfaces such as a network or port, for example. In an example embodiment, the server comprises a processor and a memory storing cross-platform application code for execution to provide the cloud application on the server or on a plurality of platforms. A cloud application instance can be a single cloud application instantiated for use with at least one client application 230. A cloud application 210 instance may refer to an instance of a cloud application 210 that is running live on the cloud server. The same cloud application 210 (in a common code base) can run on a server 220 and connect to a number of client applications 230 that are installed on client devices. The cloud application 210 can also connect to multiple client applications 230. The server 220 is not limited to one cloud application 210. The server 220 can enable both multi-tenant or single tenant implementation for cloud applications 210 to provide flexibility.

A client application 230 is an application running locally on a client device 240. The client application 230 connects to cloud application 210 to exchange data and commands. The client application 230 renders the graphical UI based on the scene graph data received from the cloud application 210. The client application 230 refers to the computing application running on the client device 240. In some embodiments, there may be only one client application 230 per client device 240. In some embodiments, there may be multiple client applications 230 on a single client device 240. A common cloud application (in a common code base) can run on a server 220 and connect to a number of client applications 230 that are installed on client devices 240. The same client application 230 (installed on the client device 240) can communicate to different cloud applications 210 on one or more servers 220 depending on the desired application and functionality. A cloud application 210 can also connect to multiple client applications 230.

A user interface (UI) includes components of a machine, device or system that enable interactive between a user and the machine. For example, the client application 230 renders a UI on client device 240 to enable interactions between the user and the client device 240. The UI is a portion of a machine, device or system that handles the interactions between the user and the machine. The UI can include user interface elements and workflow, also referred to herein as presentation and behavior. The user interface elements can include graphical elements. The scene graph can define a spatial representation of a graphical scene for the graphical elements, for example. User interface elements can refer to the individual objects within the scene graph, ranging from position only nodes, images, buttons, lists, or other advanced controls. The client application 230 is configured to render the user interface elements locally using the scene graph data. For example, the client application 230 is configured to render the user interface elements locally using the scene graph data by parsing the scene graph data and drawing the associated objects on screen as dictated by the scene graph data, for example with respect to a first operational state.

Common code can refer to software code written directly for the client application 230 which can be reused on different platforms with minimal or no changes. The code is therefore common across client devices and does not need to be implemented separately for a particular platform. This can imply a single point of implementation for the client application 230 with the associated reduced cost of development and reduced risk of deviation in code implementations across devices or platforms.

As noted, the client application 230 can capture and relay events to cloud application 210. Events can refer to the occurrence of operations, triggers, data sets, activations, and the like. Events can be user triggered events (e.g. activating a button), time triggered (e.g. passage of time period), event triggered (e.g. triggered by another event), based on previous system requests (splash screen followed by lander screen), and the like. Events can be implemented or handled by a client device 240 or server 220.

An example event may relate to user navigation on the user interface such as a selection event. The selection event may involve navigating to a user interface component representing a video and activation of an "OK" button to select the video for playback at the client application. The client application 230 on client device 240 sends the event data to the cloud application 210 on the server 220 in some embodiments (e.g. customer selects video X for playback). In response, the cloud application 210 can trigger or instruct client application 230 to implement specific business logic included in the scene graph data and associated with the first operational state. An example may be an out animation for current screen and an in animation for the next screen and player screen. The server 220 and cloud application 210 can define the business logic (e.g. trigger a log in screen) for different events. Some events can be handled locally by the client application 230 (navigate to items in a list for video options to play), for example so as to reduce the perception of latency with respect to actions taken in the first operational state.

The client application 230 may still inform the server 220 of a locally handled event (e.g. user is requesting item #2 in the list) so that the server 220 can keep track of current state of the client application 230. Some events are handled by the server 220 and the client application 230 will relay event data to server 220 to handle and process the event.

The distributed handling of events provides flexibility to reduce latency for events that can be processed locally and increase processing capabilities of client device 240 by delegating processing of some events to server 220. For example, some events can be handled locally at the client device 240 which can reduce actual or perceived network latency. For example, this may be achieved by rendering the UI based on the scene graph data locally and implementing platform features locally on client device 240. For example, left and right navigation associated with the first operational state can be handled on the client device 240 and the server 220 may not need to be involved to implement the navigation but it can be informed of the navigation. In some cases, an application may involve multiple different screens (with animations). At any one time the client application 230 may only need to be aware of the current instance of the screen (using the scene graph data), for example the instance associated with the first operational state, and the server 220 can manage the multiple screens and transitions between them. The client application 230 does not have to handle the complexity of the multiple screens. This may be beneficial if the client device 240 has limited capabilities and memory. The client application 230 can push complex events to the server, or the server may automatically handle the complex events and only provide less complex events for execution by the client application. Client devices 240 can have limited resources so this is helpful in order to handle these complex UI situations.

Embodiments described herein recreate a portion of a scene graph related to a first operational state that a client application 210 would normally use as a simple data structure that can then be used by the client application 230 to recreate the screen with user interface elements. A client application 230 creates the screen display with the user interface elements using its own rendering capability (for example a WebGL based renderer for Web, a C plus plus based renderer using OpenGL or DirectX for consoles or Set Top Boxes, and Roku's Scene Graph for Roku devices). The scene graph data provided by the server 220 and cloud application 210 is sufficient to have the local client application 230 create the entire user interface, one screen, or component of the screen, at a time, complete with full animation and visuals. The client application 230 recreates the user interface elements (for the entire user interface, one screen, or component of the screen) locally though a local animation and rendering unit.

As discussed earlier, a scene graph can be a data structure that arranges the logical and spatial representation of a graphical scene. A scene graph can be a collection of nodes in a graph or tree structure. A tree node (in the overall tree structure of the scene graph) may have many children but often only a single parent, with the effect of a parent applied to all its child nodes. Further, an operation performed on a group automatically propagates its effect to all of its members. In many programs, associating a geometrical transformation matrix at each group level and concatenating such matrices together is an efficient and natural way to process such operations. In an embodiment, scene graph data sent by the cloud application 210, and associated with the first operational state, relate to a portion of a scene graph, a tree node, or a portion of a tree node.

A common feature, for instance, is the ability to group related shapes/objects into a compound object that can then be moved, transformed, selected as easily as a single object. The client application 230 can include a rendering engine that is capable of calculating the updating animations locally. The server 220 provides the scene graph data in the static starting location as well as the information required to do the required animation. An example of this may be the server 220 providing the information for a full title screen, but with animation information that is to be played immediately as an "In" event. This data would be sent by server 220 to the client application 230 which would then create the scene (which may be completely transparent at first and therefore not visible) and then follow the action and play the animation based on the data it received for the "In". This would animate the title screen from transparent to the final view. Since the animations are played locally the user does not experience any delays that may have come from the server 220 providing updated scene graphs at each frame of the animation.

Embodiments described herein implement a complete recreation of the user interface elements using the local platform capabilities of the client device 240 and client application 230. Screen mirroring solutions render the user interface on the cloud and send down a direct representation of that in the form of an image or video to the client to display. In this case the visual seen on the client reflects what was created on the server. In contrast to known screen mirroring, according to an embodiment of the present disclosure the server 220 does not render the user interface components at all, instead it generates or creates the scene relationship information in the form of scene graph data. A scene graph may be a hierarchical data structure of objects for the UI within the structure. The scene graph can include internal engine features or characteristics as the objects for the structure. This defines the hierarchy for the objects of a graphical scene. The server 220 provides scene graph data based on this information for the client application 230 to use as a building guide to create the visual user interface elements locally. This means that the solution also adopts the limitations of the hardware of the client device 240.

For example, some over-the-top services do not support 3D objects or rotational motions on some devices. These limitations would also affect embodiments described herein since the client device 240 hardware for the over-the-top service is recreating the display (user interface elements) from the scene graph information received from the server 220. The server 220 can inquire from the device 240 what type it is and choose a design implementation and layout suitable to the known limitations of the device 240 from an already prepared design provided by the customer whose application it represents. For example, customer X may know the target over-the-top services and knows that the different platforms for various over-the-top services may have vastly different capabilities. The customer may plan a user interface design that uses advanced features for one over-the-top service, but minimal features for another over-the-top service that may have limited hardware capabilities.

One of the hurdles of cloud based solutions is latency: the delay between a user action and a visual response from the device. In traditional cloud based solutions, such as those that provide video or images of server generated layouts, the delay is a combination of the network latency, the server response time, and the client redraw. This total latency can make some cloud solutions completely unusable. Embodiments described herein provide a cloud solution that has the advantage of using the client device 240's own rendering mechanism and adopting the controls it provides locally. This can eliminate latency, particularly when the client device 240 is only concerned with the user interface elements associated with the first operational state. For a given platform, the server 220 sends down the information needed to recreate controls such as list views, for example, which the client application 230, then creates and controls locally at client device 240. Any user interaction with these controls is the same as for interactions with an application that runs locally on the client device 240. When a navigational selection is made by a user at client device 240 that requires a change in the scene graph from the server 220, the client-server connection is updated and the new screen is displayed based on updated scene graph data, for example relating to a second operational state. In an implementation, the client application 230 deletes the previously received scene graph data in response to receipt of the updated scene graph data. Latency in building the new display can be normal on these devices, and the total latency during these operations is now increased by the network latency and server response time. Since these delays are minimal in comparison to the client's normal screen creation time they generally do not perceptively change the user's perceived interaction time.

As an illustrative example, the client application 230 can be running and awaiting input from the user. The user uses the client device 240 input controls to perform an action (e.g. button press). The client application 230 determines if the received input or received action is associated with a locally processed event or a server processed event. For example, if it is navigation of a list, it may simply be handled locally; if it is a selection event that triggers an action in the UI then it will be sent to the server 220. In the event that the server 220 handles the event to provide action to the client application 230, then the client application 230 can send the information to the server 220. The server 220 can apply the action locally and determine the outcome. The server 220 can send the updated information to the client application 230. The client application 230 can update based on the local action or the remote action and present the updated view to the user. The operation repeats at the next user action in a subsequent operational state.

The server 220 can inform the client application 230 of potential actions of various kinds that are small enough in scope or processing requirements for the client application 230 to handle at the client device 240. This can allow for "plan ahead" concepts where the server 220 tells the client application 230 what to do with potential actions (left, right, up, down, and enter) that can be processed locally. In this case when a user event occurs the client application 230 executes the action it was instructed to do by the server 220. The client application 230 tells the server 220 that it took that action. This may then allow the server 220 to determine what the next possible actions may be and tell the client how to handle them. In this way the network delays may become imperceptible to the user for most actions since the action response is immediate. Only fast repeated actions may show evidence of the network delays, limiting the time between subsequent user input events.

As mentioned above, in an embodiment, the cloud application 210 sends first state scene graph data comprising presentation data and behavior data for a first set of user interface elements viewable at the client device in a first operational state. In an example embodiment, the cloud application sends all of the first state scene graph data at the same time, or in a single transmission. In another embodiment, the cloud application sends a first portion of the first state scene graph data at a first time, and sends a second portion of the first state scene graph data at a second time. In an implementation, the cloud application 210 sends the second portion based on client application availability, or based on network performance, or after expiry of a timer. In an implementation, the cloud application 210 is configured to dynamically adjust a planned schedule of sending portions of the first state scene graph data in response to event data or state data received from the client application 230.

For example, if there is a poor performing link between the cloud application 210 and the client application 230, in an implementation the cloud application sends first scene graph data comprising a screen, a list and the first 10 items in the list so that the user is able to start interacting with the user interface. The cloud application 210 can then send the remaining portions of the first scene graph data at a later time, either after expiry of a timer, or in response to receipt of an indication that the client application 230 is in a state in which it can receive additional scene graph data. In so doing, embodiments of the present disclosure provide an intelligent approach to poor performing networks, and still provide good performance.

Figure 3:
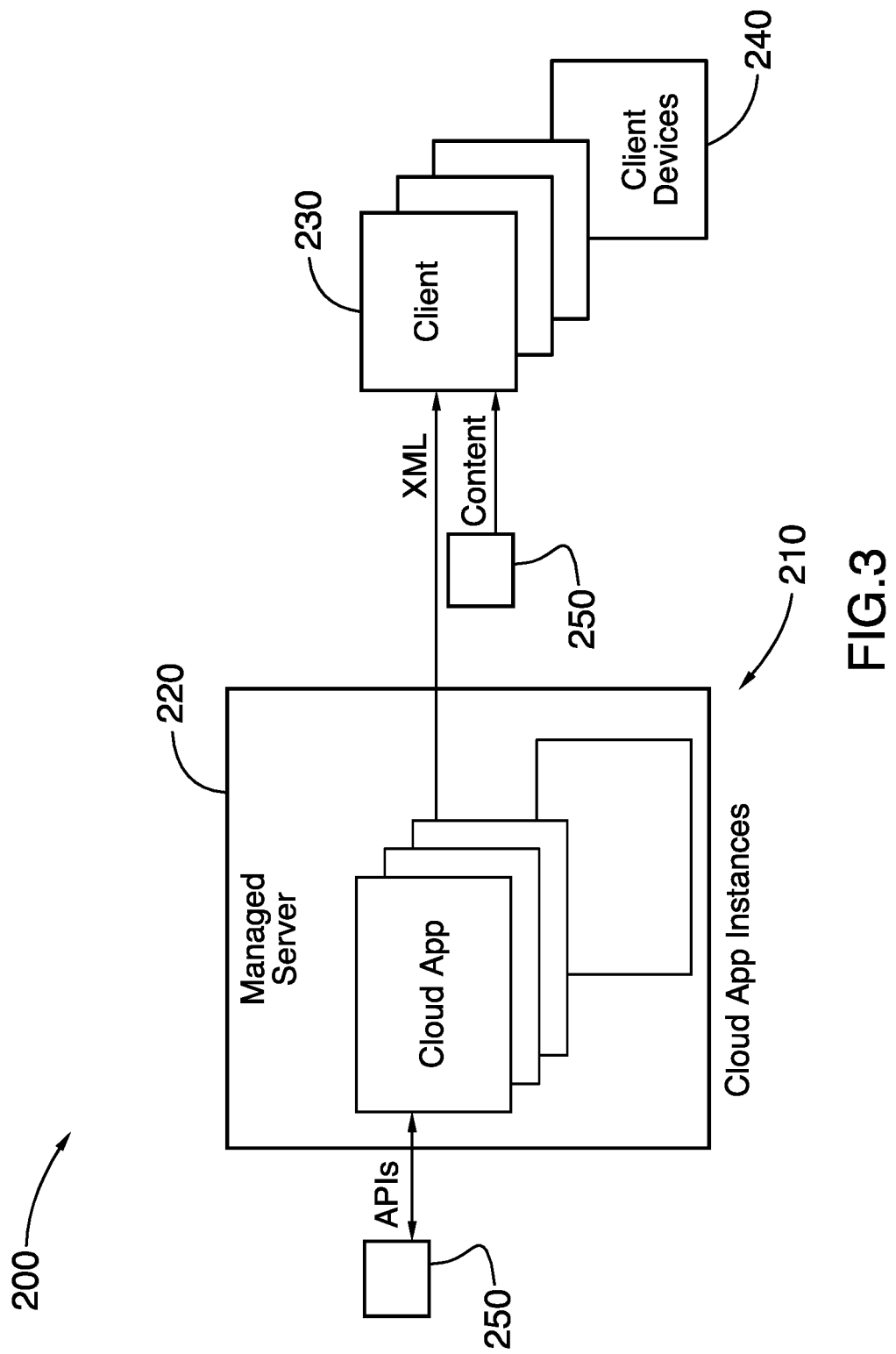
FIG. 3 illustrates a block diagram of a container based architecture for holding instances of a cloud application running on a cloud server according to embodiments described herein.

FIG. 3 shows another example architecture of system 200 with a one to one correlation between cloud applications 210 and client applications 230. In some embodiments, a single instance of the cloud application 210 may be associated with a single client application 230, as shown. There may be a cloud application 210 instance for each instance of client application 230. The server 220 may use containers, such as instance containers, with one container per instance of the client application 210. A server 220 associated with, housing, and/or running one or more instances of the client application 210 may employ docker-based container architecture to enable a plurality of instances of engine 210 to be housed on, running on, and/or associated with server 220. A client application 230 may be based on non-brand or non-device specific code, for example, a client application 230 may be written using identical code irrespective of a client device 240, brand, or platform that the client application 230 may be deployed on. The code may be packaged with additional information, scripts, documentation, or code that may differ according to the platform or brand the client application 230 may be deployed on.

A single basic client application 230 can be created for each platform associated with the over-the-top service, web service or set top box. In an implementation, this same application 230 uses common code regardless of the specific customer applications. The client application 230 code can always be the same regardless of the use or customer application, for example. This does not mean the client package is the same: the client package can contain additional files or code as required by the platform itself. For example, the platform Roku requires applications to have images for Icons as part of their application packages and these would be different in the client package for each customer or brand. In this way the client package does vary, but the application code of the client application 230 may not. That is, the application code can always be the same smart common client code.

All client applications 230 associated with or deployable on the same platform, irrespective of the brand, type, design, architecture, or identity of any associated client device or devices 240, may be interoperable with instances of the same cloud application 210. Using a single code-base for client applications 230 associated with or deployable on the same platform may allow for a cross-platform one code base model. This enables shorter development timelines to deploy on a given platform and/or compatibility with a greater number of platforms. In some embodiments, the cloud application 210 may be identical to an application interoperable with a native deployment model, an example of which is illustrated in FIG. 1. Using the same cloud application 210 may similarly allow for a single code base across both native deployment models and deployment models where the cloud application 210 is cloud-based or located in one or more remote servers, for example, as in system 200. A single code base model may facilitate a consistent experience and minimize application development efforts.

According to some embodiments, there may be a single cloud application instance 210 per user (e.g. client device 240). This may provide more resilience in case of system crashes or failures in the market since a single client application 230 crash may only affect a single user. This can be controllable for the cloud solution and part of the value proposition. This can control the number of user instances per cloud application 210 and change this dynamically to provide more users or more potential risk aversion.

Figure 4:
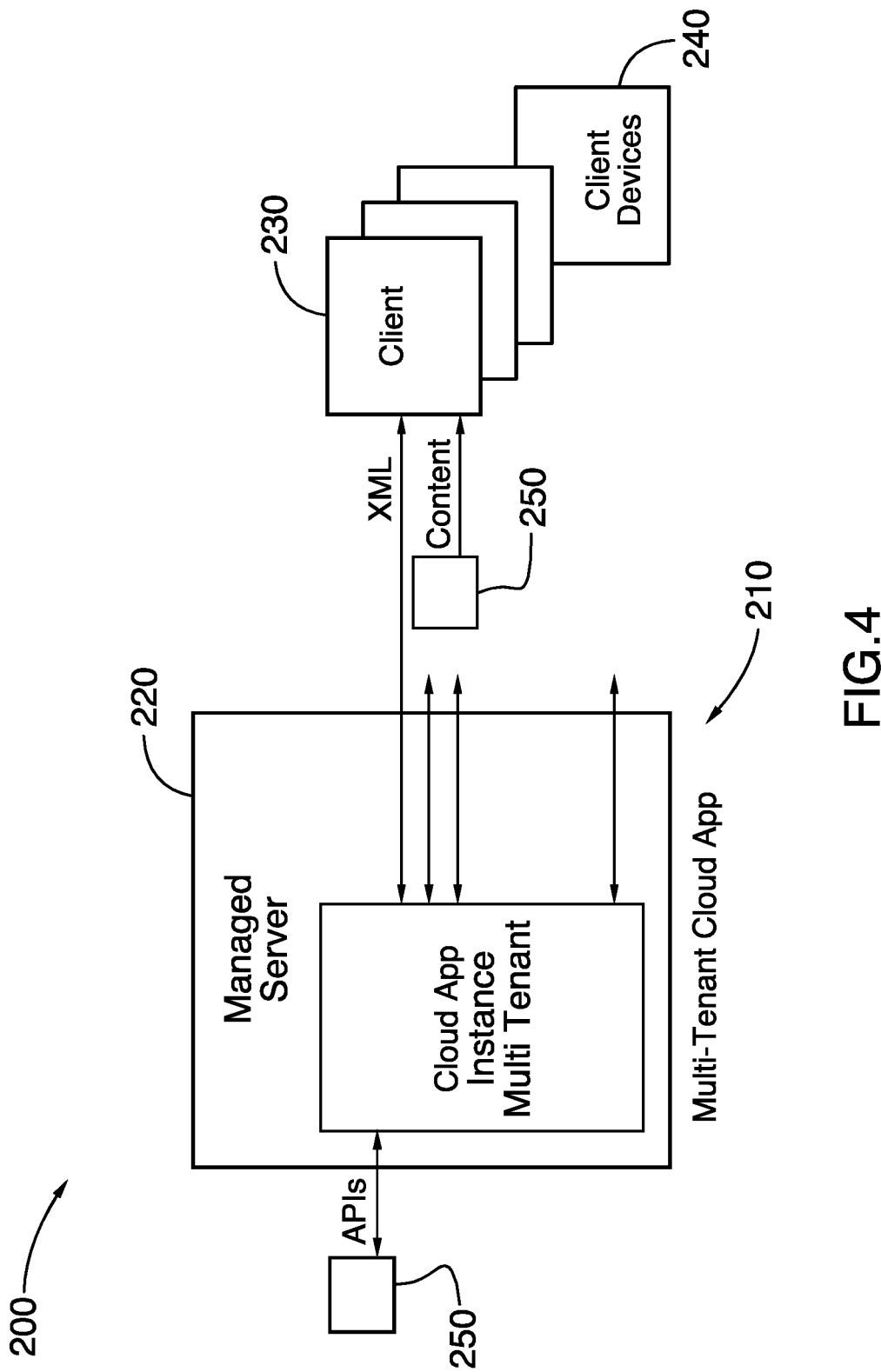
FIG. 4 illustrates a block diagram of another instance of a cloud application running on a cloud server according to embodiments described herein.

FIG. 4 shows another example architecture of system 200 with one cloud application 210 serving multiple client applications 230. In some embodiments, a single instance of the cloud application 210 may be associated with a plurality of client applications 230, enabling a multi-tenant system, as shown in FIG. 4. Using a single instance of the cloud application 210 for a plurality of client applications 230 may enable a more scalable and efficient architecture to cause display on a plurality of client devices 240 associated with the client applications 230 of one or more user interfaces assets. As noted, example user interface assets include components of a user interface, scene graphs, graphic frames that may, for example, be used to render or display a scene, videos, graphical environments, graphics, such as 3D characters; and/or graphics information.

Figure 5:
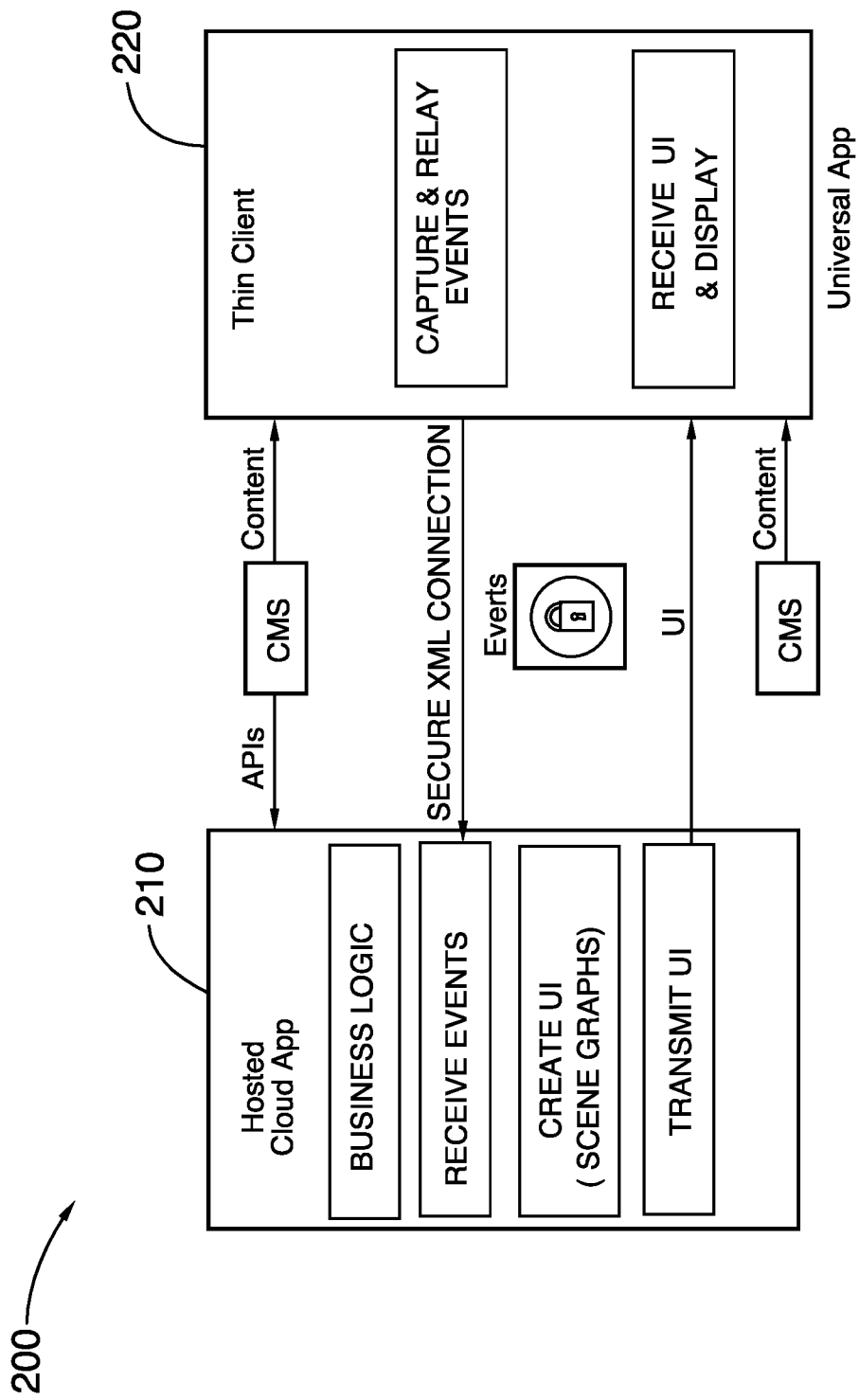
FIG. 5 illustrates a block diagram of another user interface or graphics deployment system according to embodiments described herein.

FIG. 5 shows another example architecture of system 200 with smart common client application 230. This may allow compatibility with platforms housed on devices with minimal or limited hardware resources, such as over-the-top services. In some embodiments, an instance of the cloud application 210 may transmit or cause to be transmitted only a subset of data relating to and/or enabling rendering of graphics, such as scene graph data relating to a first operational state. For example, the subset of data may be one or more scene graphs and/or portions of scene graphs that encode or allow rendering of only graphics that are in view or adjacent to (above, below, left, right) graphics that are in view. This may reduce the amount of data that may be received, stored, and/or processed by a client application 230 and/or associated client device 240 and therefore provide a quicker or near real-time display of graphics on request by the client application 230 and/or associated client device 240. In some embodiments, a client application 230 and/or associated client device 240 may also provide for local control or requests of data associated with and/or enabling rendering of graphics. This may provide for a quicker or near instantaneous display of graphics. A smart common client application 230 may be written in HTML5. A system 200 engaging with smart common client application 230 may provide the following example benefits:

the role of HTML5 code may be simply to act as a bridge to the GPU to draw pixels on screen and to capture user actions; the remaining functionality of the underlying browser is unused;

cloud application 210 may maintain the one code base model; and the client code may be identical for all applications, thereby maintaining a single code base model.

In some embodiments, such as where a Roku media device is engaged, a smart common client application 230 running on the media device may be written in code specific to the device and may employ associated scene graph capabilities. The simplicity of the media device-specific client side application may allow the code to be the same for any brand. A separate client application 230 may need to be packaged, submitted, and certified for each brand but the actual code within an application may be the same in all cases. As a result, code for the media device may be consistent with the single code base model. It may also make subsequent certifications easy and fast. In some embodiments, system 200 may take advantage of unsigned scene graph packaging that may allow scene graphs or graphics to be packaged, transmitted, and deployed to devices, for example, devices running on a Roku media device platform, on the fly without signing them ahead of time.

In some embodiments, a cloud application instance 210 may transmit or cause to be transmitted only a subset of data relating to and/or enabling rendering of graphics. For example, the subset of data may be one or more scene graphs and/or portions of scene graphs that encode or allow rendering of only graphics that are in view or adjacent to (above, below, left, right) graphics that are in view. This "partial" scene graphs approach with local controls may allow for very complex applications that can run on minimal hardware, such as that characteristic of Roku. Client applications 230 may take less than 100 KB, which may be much lower than the tens of MB that may otherwise be required.

In some embodiments, system 200 may include a security layer, for example, HTTPS. The security layer may vary by platform engaged with system 200.

Hosting the cloud application 210 on a remote or cloud-based server 220 according to some embodiments of system 200 may allow a faster and/or a more cost effective way to provide graphics, such as videos, movies, and/or natural user interface components, to a platform and/or to a plurality of different platforms, including niche or future platforms, as compared to a native deployment model as in FIG. 1, for example, that may not be compatible with a native deployment model. A single code base model may also facilitate faster and/or a more cost effective way to provide graphics to a platform and/or to a plurality of different platforms. For example, to engage system 200 with a new platform, existing code implementing a cloud application 210 that provides service to another platform may be used to engage the new platform. Similarly, existing code implementing a first client application 230 on a first platform may be used to implement a second client application 230 on the new platform after packaging the code with supporting scripts, documentation, and/or additional code. For example, platforms that port are connected to the cloud application 210 directly can use a common code base with a number of common cross platform elements. In some cases, common cross platform elements may need to be re-written for the new platform, potentially deriving from code for other existing platforms. Examples would be file system access, network access, video playback.

In some embodiments, system 200 may be interoperable with different client devices 240. Advantages of system 200 may include meeting or exceeding acceptable performance targets, for example, a particular time (e.g. 20 seconds) to launch of a client application 230 on a client device 240; a particular time (e.g. 200 ms) for a remote response, for example, involving request, retrieval, and drawing of a subsequent scene, graphic, or frame; and/or a minimum number of frames (e.g. 30) per second on low-end client devices 240 or number of frames (e.g. 60) per second on other devices 240. This may allow support by device manufacturers and industry. An example media device is Roku. An example Roku platform may include high-end (GPU) platforms such as Roku 2+, Roku Stick, Roku 3, Roku 4, and future iterations and/or equivalents and may include low-end (non-GPU) platforms such as Roku 1, Roku 2, Roku TV, and Roku Express.

In some embodiments, system 200 may support and/or enable applications with many active users to provide a scalable solution. For example, system may support 500,000 users or more. In some embodiments, system 200 may be highly scalable on the fly or dynamically to support and manage activity spikes and/or applications engaging a high average number of users. Scalability may be in reference to processor, memory, and reliability (redundant, multi-zone, etc.) and may support and/or enable user growth and special events. This is an automatic scaling provided by cloud services. In an implementation, the remote server 220 comprises a control application, such as a docker container, for spawning new servers if demand is high, such as by creates an empty container and gets the system into a ready state. For example, a single cloud application instance 210 associated with a remote server 220 may provision a plurality of client applications 230, client devices 240, and/or users. In some embodiments, system 200 may have reliability with a high percentage (for example 99.95% in some cases) availability. The system 200 can control various configurations for example: single user per instance, or multiple users per instance. There may also be other implementation variations of the cloud application 210 (code change on the server 220). The choice on configuration can be made based on the importance of reliability of the client application 230 to potential customer (e.g. reduce or eliminate crashes versus cost of more cloud instances). For example, during a major sporting event it may be preferable to have more individual cloud application 210 instances so that a single failure would only impact a single user. Reliability can also relate to external web services that may be outside of the control of server 220 as it can only control reliability within the scope of the application code running on the cloud servers 220.

Figure 6:
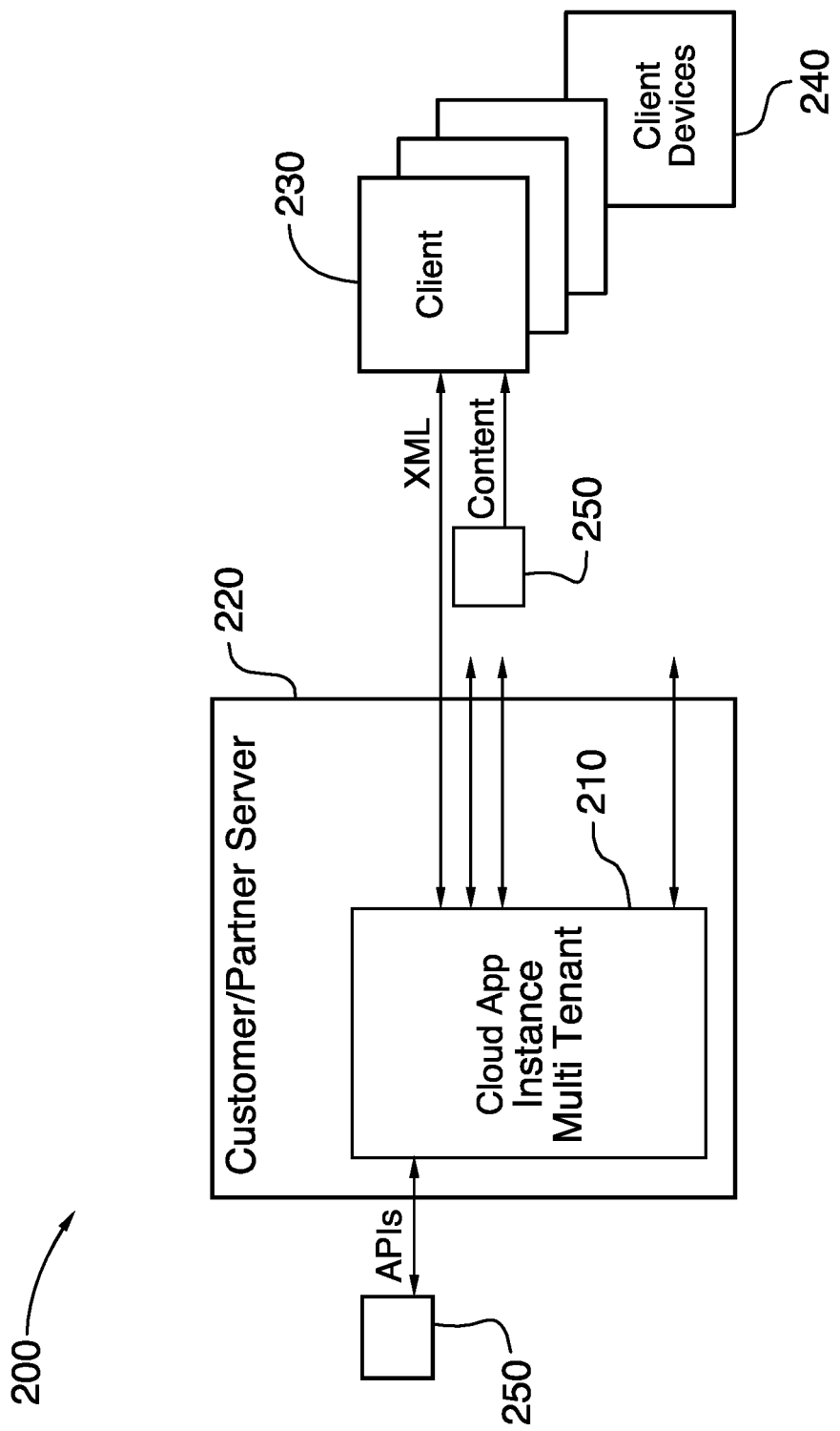
FIG. 6 illustrates a block diagram of another user interface or graphics deployment solution that implements a platform as a service model, according to some embodiments described herein.

FIG. 6 is a diagram of an example implementation of system 200 implementing a platform as a service (PaaS) model. In some embodiments, system 200 may implement a PaaS model, for example, supporting an option for partners and/or customers to host engine 210 on one or more servers 220 managed by same. In some embodiments, system 200 may include one or more cloud applications 210 associated with one or more servers 220 managed by different entities, partners, and/or customers. A single code base model in these embodiments may allow rapid deployment by or on different entities, partners, or customers. That is, a first client application 230 compatible with a first platform that runs on one or more client devices 240 may be implemented using code identical to code implementing other client applications 230 that may be or become deployable on other platforms. The first client application 230 may be deployed on a first platform by packaging the code with supporting scripts, documentation, code, and/or customer support. The supporting scripts, documentation, code, and/or customer support may be different from that supporting deployment on other platforms. This may enable rapid deployment. A cloud application instance 210 may support a single tenanted or a multi-tenanted system as described above.

Figure 7:
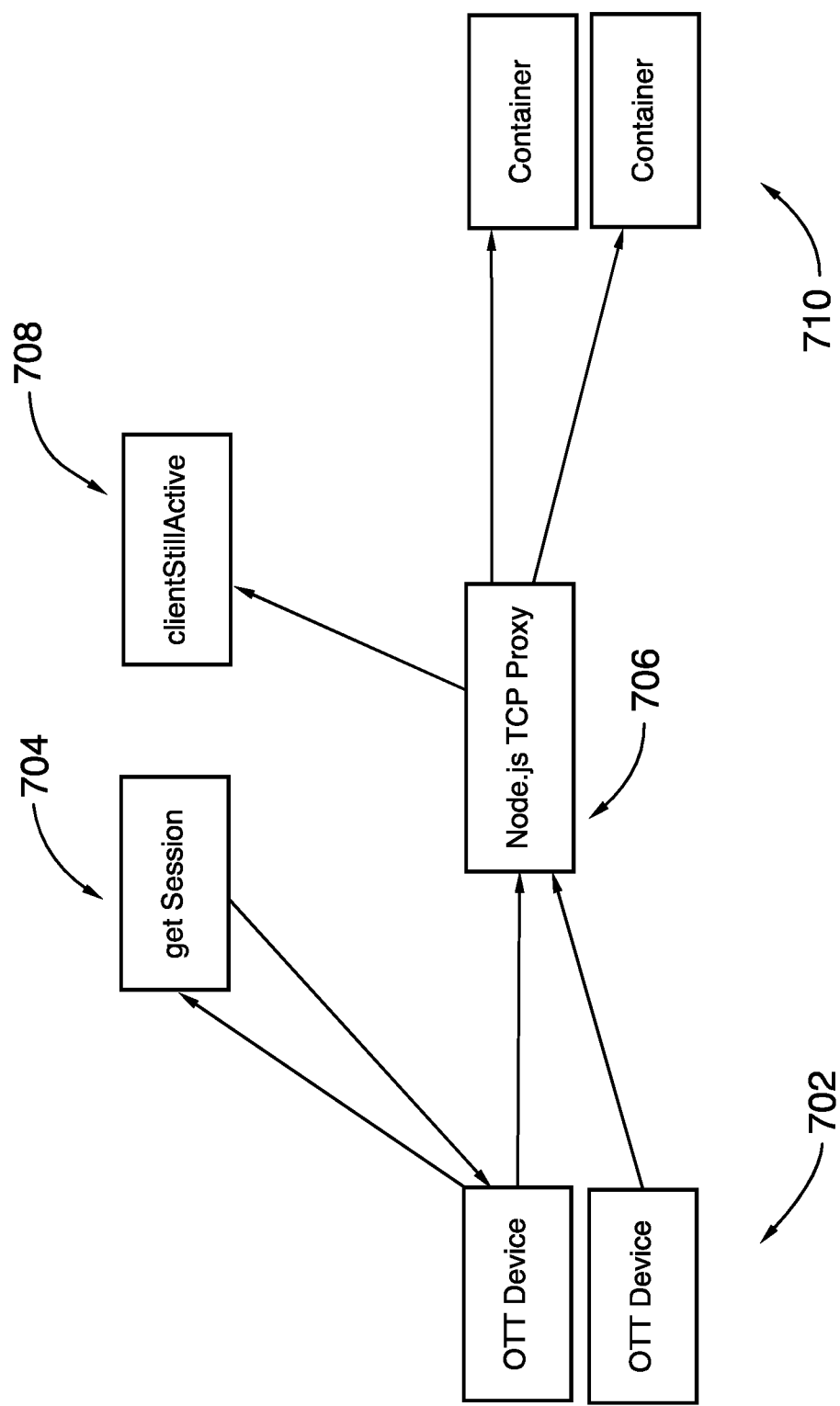
FIG. 7 illustrates a flow diagram of a workflow for an over-the-top service platform according to some embodiments described herein.

FIG. 7 illustrates a diagram of a workflow for an over-the-top service platform according to some embodiments described herein. The example in FIG. 7 is only one example embodiment, and other implementations can be performed with different implementation details.

An over-the-top (OTT) device 702 for an OTT service platform is an example client device 240 that includes a client application 230 that connects to a cloud application 210 of server 220. The OTT device 702 obtains a session identifier from a web service provider using a getSession command (704). The OTT device 702 (or service platform) then opens a TCP socket with a proxy server on a port, which may be referred to as Node.js TCP proxy 706. The OTT device 702 sends the session object to the proxy server (Node.js TCP proxy 706). The proxy server opens a backend socket to a container 710 (for the client application 230) based on the session object (e.g. session object has a hostname and port of the container 710). Bytes flow freely between the OTT device 702 and the client application 230 on the container 710. Although the data is a pure pass-through, the proxy server inspects and sniffs the traffic of data and logs an inspection entry in an audit log any time the proxy server parses a full null delimited command (in either direction). The proxy server can detect hangups on either end (e.g. inactive, connection closed). The logs are standardized as inspection entries in the audit log. The logs or inspection entries are treated as events with a topic and a timestamp, for example. The proxy server also has a throttle timer for every client that that fires on SNS event four the web services when there is user activity. The OTT device 702 sends an input event over the connection. The proxy server can scale to thousands and thousands of concurrent connections.

In some embodiments, system 200 may provide full sandbox environments for each client application 230 that may be associated with or included in system 200. This may provide security and reliability for each client application 230, where any capacity-related characteristics, bugs, or problems with an application 230 may not affect any other applications 230 in relation to all or some characteristics, for example, characteristics indicative of performance, security, or service. This may be true between one or more different applications 230, for example, associated with the same or different instances of cloud application 210 and/or servers 220.

In some embodiments, improved performance may be provided in relation to client application 230 launch time and/or time to start drawing or rendering graphics in relation to a client device after request, for example, by clicking a button. This may be supported by pre-loading graphics off screen to facilitate fast scrolling using a client device running client application 230. In some embodiments, system 200 may include a centralized caching mechanism to pre-emptively push content to a cache for application 230 elements that may be common to a certain number of users engaged with one or more client applications 230. This may improve performance over servers that cache content or pages only when requested, for example, when a visitor views a page. In some embodiments, system 200 may include a local caching mechanism, for example, post-caching that may store content or pages, for example, graphics, scene graphs, or assets, in a local cache when a user views the content or page; or pre-caching that may store content or pages before a user views the content or pages.

Graphics may be delivered to a client application 230 running on a client device 240 by a cloud application instance 210 on a cloud server 220. The image resolution and size may affect performance where slow downloads exacerbate perceived latency of the client application 230; where image scaling on a client device 240 is slow; and/or where a partner or customer hosting a server 220 and/or cloud application instances 210 does not have supporting documentation, scripts, training, and/or support that may enable or facilitate installation, management, maintenance, and/or provision of one or more servers 220 and/or cloud applications 210 in accordance with an embodiment of the present invention.

In some embodiments, system 200 may use a single application 230 irrespective of client device 240 that runs the application 230. The graphics or user interfaces rendered on a client device 240 running the application 230 may be adapted based on one or more characteristics, for example, relating to fidelity or performance capability, of the client device 240. The user interface elements can be dynamically updated once the server 220 and cloud application 210 detect capabilities of client device 240 including the type of client device 240. For example, due to various resolutions, aspect ratios, and form factors there may be different visual designs created and loaded for the same application 230 on differing platforms: For example, a 10 foot television may have direction control only as compared to a tablet device with touch input control. The cloud application 210 can interrogate the client application 230 to determine the device 240 capabilities or limitations and choose a layout that conforms to the devices 240 capabilities or limitations. In addition, customers can choose features that can be "dropped" on lower end devices such as expensive visual effects like blurring. These are dynamically performed in the application code based on device type or platform.

In some embodiments, the architecture of system 200 may be "container" limited rather than CPU/activity limited. That is, a factor limiting performance of system 200 may be the number of active sessions rather than how much a user scrolls and clicks during a session and thereby how many users must be served new graphics, for example, scene graphs, at the same time. In some embodiments, system 200 may include a unit for understanding what is limiting the number of containers and address and/or add resources to system 200 or a component of system 200 in response. In some embodiments, system 200 may include a unit for reserving containers each holding an instance of cloud application 210 when a client application 230 and/or client device 240 is engaged with, interacting with, and/or requesting graphics from one or more instances of engine 210 and/or one or more servers 220 associated with a cloud application 210, for example, when a user is scrolling and/or clicking on a client application 230 and/or client device 240 or otherwise indicating to a client application 230 and/or client device 240 a request for one or more graphics from one or more instances of engine 210 and/or one or more servers 220 associated with a cloud application 210.

For example, system 200 and/or one or more servers 220 associated with a cloud application 210 may store the state of a system 200 and/or the state of a component of a system 200, for example, the state of an instance of cloud application 210 that may be engaged with a client application 230 to provide one or more graphics to the user. When a new container is initiated, the state may be restored or re-applied to system 200 and/or a component of system 200, for example, an instance of cloud application 210 that may be held in the new container. Both units may assist with optimization of system 200, for example, in terms of performance, scalability, and/or cost, in a situation of concurrent client applications 230 and/or client devices 240 engaged with one or more instances of cloud application 210 and/or a server 220 associated with a cloud application 210.

The system can assess the number of concurrent users, that is, users accessing one or more client applications 230 at the same time. For example, the number of concurrent users is known based on the containers. In some embodiments, system 200 may track, store, and/or receive metrics relating to the number of concurrent container users, that is, active sessions between a client application 230 and an instance of cloud application 210 or other data that may indicate an active session. A single cloud application 210 instance can handle multiple active users. In some examples, there may be a 1:1 ratio for cloud application 210 to client application 230. The definition of an active user can vary from application to application and may refer to the client requiring information from the server 220, which may not be possible with some applications, or very common in others. Active sessions can refer to users who are using the interface at the time. Client application 230 can be a video application. The user tends to spend the majority of their time in the video playback and not the interface.

An active session refers to when the server 220 must maintain contact with a given user, which may not be required during video playback, or when the user is away from their device 240 for a period of time. A session may be active when a user engaged with a client application 230 scrolls, clicks, and/or indicates a request from an instance of a cloud application engine 210 for one or more graphics, for example, a scene graph update. A client application 230 that merely plays graphics, for example, a video, that has already been received from a cloud application instance 210 by the client application 230 may not constitute an active session. System 200 may associate a container for each active session or user. System 200 may free-up a container associated with an instance of a cloud application 210 that may provide one or more graphics to a client application 230 and/or client device 240 if the client application 230 and/or the client device 240 is not active, for example, is merely rendering a graphic, for example, a video.

For example, a freed-up container may then be associated with a different instance of a cloud application 210 that may be associated with a different client application 230 and/or client device 240. A freed-up container may be indicated as such by associated data such as a flag indicating the container may be associated with an instance of a cloud application 210. A container may be freed-up, for example, have the flag set, 30 seconds after a client application 230 and/or client device 240 requests a graphic from a cloud application instance 210 associated with the container and has not requested any graphics since, as may be the case where a user requests a video via a client application 230, the video is stored in cache associated with the client application 230, and the video is played. For example, once a user starts watching a video, if the user does not click on a control that requires a user interface change, a container may be freed up for another user.

In some embodiments, a container may be made available, for example, associated with an instance of a cloud application 210, within 1 second of a request for a graphic or new scene graph by a client application 230 or client device 240 associated with the instance of cloud application 210. In some embodiments, system 200 may avoid user interface or graphics overlays and may use local controls. For example, a client device 240 and/or client application 230 support a native application for rendering graphics, for example, a native video player. This may allow a user engaged with a client application 230 and/or client device 240 to play, pause, fast forward, rewind, and/or interact with one or more graphics using local controls without requesting one or more graphics such as scene graph changes from a cloud application 210 and/or server 220. This may allow the client application 230 to not use or not be associated with an instance of cloud application 210 or a container.

In some embodiments, system 200 may track, store, and/or receive metrics relating to a number of concurrent requests for graphics, for example, scene graph updates. For example, this may be the case where concurrent users "browse", scroll, click, or otherwise request graphics or user interface changes, using a client application 230 at the same time in a way that may request graphics or scene graph updates. For example, if a client application 230 facilitates or is associated with a video game, player actions during viewing may involve local controls of a native player associated with a client device 240 and/or a client 230 rather than requests to a cloud application instance 210 for graphics. Concurrent users can be users requesting graphics from cloud application 210, for example, by browsing or scrolling or clicking. An advantage of a cloud-based solution can be that local controls are used on the client applications 230. This means that on a specific device for an over-the-top service a customized list view can be within our client application 230 to provide a list view for a user. This list views gets information from the customer content management system directly, and acts like a local application on the client device 240 during interaction with this control. During these times the server is idle and can be assigned to other users. The cloud application 210 can track the metrics of how users are interacting with the user interface rendered by client application 230 to determine workload. Then the cloud application 210 can apply controls to distribute the workload to subsequent applications 230 to help reduce server interaction. For example: an update to a client application 230 may change the screen layout to provide direct access to video playback instead of navigation through a preview or details information page, which would alter the server load and improve costs or view experience.

Some over the top services or platforms provide custom code to create and populate the list view elements. For example, there may be base controller for the list view as a node in the scene graph at the correct location and size. There may be a template of the list item's view. There may be a data model binding to create the list items based on the data source. The scene graph may not contain the complete list of all items at the server 220 side (for example, lists could have thousands of potential items). The scene graph created by the server 220 has the information about the list view for the client application 230 to use to create and populate the list locally. In the cloud application 210 based client application 230 this may be a list view populated by the data model based on client code logic to fetch the information and apply it. For some platforms, this may include code custom for the platform type such as Roku specific operations handled by the client device. The cloud application 210 provides the building blocks to the client application 230 which then creates the items as it is able to, within the restrictions of the client platform.

The architecture of system 200 may be a very powerful deployment architecture that can provide complete platform coverage while also putting all the intelligence in the cloud where it can more easily be upgraded without the need to submit new applications to an application store. This architecture may provide more centralized control over a native deployment model and may minimize any need to update or upload applications.

In some embodiments, system 200 may provide for separate instances and load balancers for each customer, sandboxing of customers on one or more server 220, sandboxing of client applications 230, an API facilitating interaction between server 220 and applications 230, an API addressing security, an API addressing time-stamping and overall synchronization, and/or caching client applications 230 to make them more robust.

In some embodiments, system 200 may support different methods of deployment for applications 230, for example, a full native C++ application, mixed applications (for example, having some functionality at SDK level), and/or a client-server user interface engine. These methods of deployment may vary by characteristics relating to performance, visual impact, dynamic updates, and/or other features. The best experience and capabilities may come from using a core C++ cross platform solution. System 200 may use a different method of deployment where a platform to be deployed on limits C++ application access.

In some embodiments, system 200 may use an internal scene graph based graphics rendering. For example, application business logic, components, visual assets, etc. may be processed by a server component 220 and may facilitate presentation of a complete screen level scene graph on, by, or in association with a client device 240 and/or client application 230. As an example, this approach may be used with HTML5 and WebGL to create a simple scene graph viewing system that may output the graphics of a server application at the cloud application 210. For normal applications the cloud application 210 can be compiled with the application 230 code in a 1:1 ratio. For the cloud solution it is possible to allow the application 230 to spawn multiple instances for users which all use the same cloud application 210. This is sometimes done in games that support "split screen" as a means to run two instances of the same game on a single platform at once.

The server 220 creates an instance of the application 230 using the cloud application 210. For platforms on which the engine 210 runs directly, there may be only one client application 230 so that more than one application instance is not running at a single time on a single display. However, there is nothing preventing the creation of multiple instances in the same application 230. This can be done with the cloud solution, enabling a single runtime instance of the application to support more than a single user. Basic screen level navigation may be handled within the local context, for example, without additional requests to a cloud application instance 210 for additional graphics. If a certain threshold is reached, the client application 230 may request further information from a server 220 and/or cloud application instance 210 to continue with the application life cycle. This process may be fully dynamic and may result in the application 230 appearing to be running locally, for example, with no perceptible server-led impact in performance or delays or other characteristics.

In some embodiments, the thresholds used by system 200 may be dynamic and a client application 230 may require that one or more servers 220 create scene graph data live at runtime for deployment to the client device 240 and/or client application 230. For example, this may facilitate an on-demand video (VOD) application 230. In an on-demand video application 230, an entire scene for VOD content may be sent to a client 230 at application launch. If the complexity of a screen rendered by the application 230 and/or a client device 240 is such that only a single content array is needed, then the application 230 can contain the complete VOD scene graph and user inputs may be handled as local navigations for visual updates. If a user engaged with application 230 makes a selection from the VOD content, the application 230 and/or client device 240 may then request a change or graphics from the server 220. For example, this may provide an updated scene or updated graphics to display with associated animations information. The application 230 may build this new scene and may transition or cause a client device 240 display to transition to it, displaying the new graphics using client device 240.

In some embodiments, as the complexity of a client application 230 increases, interaction between a server 220 on the one hand and a client application 230 and/or client device 240 on the other hand may vary. For example, prior to user interaction with client application 230, a client application 230 and/or client device 240 may build areas of a scene graph and/or graphic that may only show simple information, such as related only to a first operational state. This may allow for highly complex applications 230 to simply "change focus" based on user interaction and minimize any potential for overly complex scene graph data to impact the application's 230 usability or performance. This feature may facilitate incredible visuals from otherwise very limited platforms or client devices 240, such as set-top boxes.

Further, this may allow system 200 to create and display scene graph data efficiently on a client platform dynamically while a user is using an application 230. For example, if a client application 230 is implemented using HTML5 (which may normally perform poorly on lower hardware platforms), system 200 may create and display complete scenes or graphics in milliseconds making the process, for example, requesting and receiving graphics data from a server 220, imperceptible to a user engaged with client application 230. This may allow for a full 60 fps even with creation and destruction of an entire scene graph every frame.

In some embodiments, system 200 including a Roku platform may employ a component library unit which may provide an efficient way to package scene graph data or graphics data. System 200 may use a component library unit to facilitate creation and replacement of screen elements as well as complete screens displayed using one or more client devices 240 and/or client applications 230.

In some embodiments, graphics and/or scene graph data may be created on or by one or more servers 220, client applications 210, and/or client application instances 210, for example, using XML, JSON, or a ZIP package. This may provide an efficient method to create graphics and/or scene graph data and may support performance related characteristics. There may be a need to comply with the requirements for the client to natively create screens. For example, Roku can require the use of Brightscript based XML format scene graph description, provided in a .zip format. For clients that create platforms created directly for server 220 (e.g. Set Top Boxes) there may be a more efficient means to package the scene information while maintaining control of the data expected by the client. For example, this may allow system 200 to dynamically create scene components or screens on one or more servers 220 without requiring any potential views or requests of graphics or scene graphs to be prepared prior to first launch of an application 230 that may otherwise require an automated mechanism to go through the entire application life cycle after every change in design or code to recreate components that may be needed for proper operation of application 230. This may avoid using a process to simulate going through an entire application flow to create and package components as complexity thresholds are met.

As a further example, creation of graphics and/or scene graph data on or by one or more servers 220, client applications 210, and/or client application instances 210 may allow system 200 to provide dynamic updates to one or more client applications 230 without using an associated client device 240 or client application 230 to package graphics or scene graph data. This may allow the one or more servers 220 to simply update previously exported graphics and/or scene information with dynamic changes. New layouts, assets, sub-screen level component changes, or other changes may not need to go through a full export process. System 200 may thereby facilitate or support presentation of dynamic components and features using, on, and/or by one or more client applications 230 or client devices 240. For example, dynamic features may include A/B testing and changing of views for certain audiences based on server led criteria, such as presenting larger fonts on a client application 230 where older users are engaged with the application 230.

In some embodiments, system 200 may be used to support a health dashboard.

The applications 230 can tie into services such as third-party analytic services to provide information as to user engagement, potential crashes in market, and so on. The cloud solution at server 220 has access to this same information as well as feedback from the client application 230 (information as gathered from the smart common client deemed valuable to product or solution improvement).

Embodiments of the present disclosure enable improved operation of a server, or a client device, or both, by distributing handling of events between a cloud application and a client application, providing flexibility to reduce latency for events that can be processed locally and increase processing capabilities of client device by delegating processing of some events to server. This permits a system to operate with client devices with relatively low specifications and provide user interface display functionality that would not otherwise be available at the client device, were it not for performing a majority of the functionality at the cloud application. Since the client application only executes based on data received from the cloud application, the client device is freed from the processing burden of having to store an entire scene graph, or even a portion of a scene graph, and render the scene graph with the associated business logic and functionality, even of portions that are not currently displayed. By no longer having to process a scene graph but rather perform "dumb" processing at a thin client of data that happens to relate to a scene graph, the client device operates more efficiently and a processor at a client device is only used to execute discrete tasks associated with the client application. The cloud application at the server, which can be more powerful and sophisticated, is then able to perform complex tasks associated with generating user interface elements and delegate a small subset of presentation and behavior tasks to the client application in relation to a first operational state.

Embodiments of the present disclosure provide an improvement in computer-related technology by providing an improvement in the operation of a computer or a computer network, and also as a set of "rules" that improve computer-related technology by allowing computer performance of a function not previously performable by a computer. For example, an application with sophisticated graphics processing requirements may not be executable on a low performance client device, such as a media player, either because of insufficient processing power, or incompatibility with the compiled or executable code for the application. Embodiments of the present disclosure enable the use of the same application with sophisticated graphics processing requirements to be executed on a server without any modification of the underlying code, and enables the cloud application to generate scene graph data relating to a first operational state so that the client device, which was otherwise unable to execute the application, to provide a user interface associated with the application.

The particular solution and way to achieve the desired outcome has been described and illustrated herein. For example, in an implementation the particular solution comprises creating and transmitting scene graph data including presentation data and behavior data for a first set of user interface elements viewable at the client device in a first operational state, without sending the entire scene graph or sending any scene graph data other than what is associated with user interface elements viewable in the first operational state. In contrast to some approaches, the client application does not simply mirror a screen from a cloud application, but provides both presentation and behavior associated with user interface elements in a particular operational state, without knowledge of any other operational states.

Embodiments of the present disclosure provide advantages to application developers. Instead of having to rewrite an application for a plurality of different platforms, an application can be developed once and run as a client application on a server according to an embodiment of the present disclosure. The cloud application is configured for communication with the client application, which is a thin client, so that the cloud application can execute on the server, and provide client device-specific data to locally render graphics relating to the cloud application, without having to run the cloud application, or understand or be aware of the surrounding business logic. The client application only needs to be able to render the received scene graph data, but when doing so in accordance with an embodiment of the present disclosure, is able to provide a user interface experience to a user that is not otherwise possible with the limitations of the client device itself, or incompatibility of the client device with the compiled code for the cloud application, or due to limitations of a network connection between the server and the client device. A further advantage to application developers is that the thin client can be the same thin client running on a plurality of client device platforms, and can be configured to interact with a plurality of different cloud applications, as long as the cloud applications are configured to communicate with the thin client according to an embodiment of the present disclosure as described herein.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A system for user interface deployment comprising:
a server running a cloud application; and a client device running a client application, the client device comprising a display screen,
the cloud application being configured to:
obtain a scene graph for a plurality of user interface elements;
convert a portion of the scene graph into first state scene graph data, the first state scene graph data comprising presentation data and behavior data for a first set of user interface elements viewable at the client device in a first operational state, the first set of user interface elements being among the plurality of user interface elements, the first state scene graph data being provided in a format compatible with the client platform, and
transmit the first state scene graph data to the client device, and the client application being configured to:
render the first set of user interface elements at the client device using the received first state scene graph data to display a user interface including the first set of user interface elements on the display screen of the client device so as to locally render the portion of the scene graph related to the first operational state,
wherein the cloud application is configured to provide first scene graph data representing a first user interface design to a first client device with advanced features, and to provide second scene graph data representing a second user interface design with fewer features to a second client device with limited hardware capabilities.

2. The system of claim 1 wherein the cloud application and the client application are configured to exchange event data representing client application state information or cloud application state information.

3. The system of claim 1 wherein the first set of user interface elements comprises an empty scene graph element, and wherein the first state scene graph data comprises instructions for the client application to communicate directly with a content management system (CMS) to populate the empty scene graph element.

4. The system of claim 1 wherein, in response to receipt of event data at the client application from the cloud application, the client application is configured to communicate directly with a content management system (CMS) to acquire content independent of the cloud application.

5. The system of claim 1 wherein the cloud application sends a first portion of the first state scene graph data at a first time, and sends a second portion of the first state scene graph data at a second time.

6. The system of claim 1 wherein the cloud application is further configured to differentiate between cloud application scene graph data and client application scene graph data, and to convert the portion of the scene graph into the first scene graph data based on the determined client application scene graph data.

7. The system of claim 1 wherein the cloud application comprises:
a business logic unit storing a state of the application;
a server event communication unit configured to receive events from the client application; and
an internal renderer configured to create the scene graph and to convert the scene graph into the first state scene graph data to facilitate display at the client device.

8. The system of claim 1 wherein the client application comprises:
a client event communication unit configured to detect and capture event or status data and transmit the event or status data to the cloud application; and
a local renderer to receive the first state scene graph data and to locally render the first set of user interface elements.

9. The system of claim 1 wherein the cloud application is configured to generate the scene graph.

10. The system of claim 1 wherein the server runs the cloud application on a server platform, and the client device runs the client application on a client platform, the client platform being different from the server platform.

11. The system of claim 1 wherein the server further comprises a centralized caching mechanism to pre-emptively push content to a cache for elements of the client application that are common to a plurality of users engaged with one or more client applications.

12. The system of claim 1 wherein the client device further comprises a local caching mechanism employing either pre-caching or post-caching based on user views within the user interface.

13. A system for user interface deployment comprising:
a server running a headless cloud application, the cloud application configured to generate and transmit scene graph data including presentation data and behavior data for a first set of user interface elements; and
a client device running a client application, the client device comprising a display screen, the client application configured to receive the scene graph data relating to the first set of user interface elements which are viewable at the client device the first operational state, and to locally render the first set of user interface elements on the display screen to locally render the portion of a scene graph related to the first operational state;
wherein, in response to a user input, the client application:
transmits event or state data to the cloud application; and performs an action associated with the user input while awaiting receipt of updated scene graph data so as to reduce perception of latency.

14. The system of claim 13 wherein, in response to a user input,
the client application:
transmits event or state data to the cloud application; and
performs an action associated with the user input while awaiting receipt of updated scene graph data so as to reduce perception of latency.

15. The system of claim 1 wherein the client application is configured to, in response to receipt of updated scene graph data, delete previously received scene graph data.

16. The system of claim 1 further comprising an associated client device, and wherein the client device is configured to facilitate display of one or more of the user interface elements on the associated client device.

17. The system of claim 1 wherein the cloud application comprises a cross-platform client application running in a headless form on one or more remote servers.

18. The system of claim 1 wherein, in response to a navigational selection made by a user at the client device that requires a change in the scene graph from the server, a connection between client and the server is updated and a new screen is displayed.

* * * * *